US007170237B2

(12) United States Patent
Suzuki et al.

(10) Patent No.: US 7,170,237 B2
(45) Date of Patent: Jan. 30, 2007

(54) DEVICE FOR OPERATION OF A HIGH PRESSURE DISCHARGE LAMP

(75) Inventors: Yoshikazu Suzuki, Himeji (JP); Katsumi Sugaya, Himeji (JP); Tomoyoshi Arimoto, Himeji (JP)

(73) Assignee: Ushiodenki Kabushiki Kaisha, Tokyo (JP)

(*) Notice: Subject to any disclaimer, the term of this patent is extended or adjusted under 35 U.S.C. 154(b) by 15 days.

(21) Appl. No.: 11/189,888

(22) Filed: Jul. 27, 2005

(65) Prior Publication Data

US 2006/0022613 A1 Feb. 2, 2006

(30) Foreign Application Priority Data

Aug. 2, 2004 (JP) ............................ 2004-225390
Apr. 28, 2005 (JP) ............................ 2005-131163

(51) Int. Cl.
*H05B 41/16* (2006.01)
*H05B 41/24* (2006.01)
(52) U.S. Cl. ...................................... 315/246; 315/291
(58) Field of Classification Search ................ 315/224, 315/246, 287, 291, 307
See application file for complete search history.

(56) References Cited

U.S. PATENT DOCUMENTS 6,646,389 B2 * 11/2003 Kobayashi ............... 315/209 R
6,713,972 B2 * 3/2004 Nakagawa et al. ......... 315/291

* cited by examiner

*Primary Examiner*—Tan Ho
*Assistant Examiner*—Leith Al-Nazer
(74) *Attorney, Agent, or Firm*—David S. Safran

(57) ABSTRACT

To positionally stabilize the arc spot in a super-high pressure discharge lamp which is filled with at least 0.20 mg/mm$^3$ of mercury and to prevent the formation of so-called flicker, in an operation device having a high pressure discharge lamp and a feed device, the feed device of the high pressure discharge lamp supplies a frequency in the range from 60 Hz to 1000 Hz as the stationary operating frequency and a low frequency, in a frequency range of from 5 Hz to 200 Hz is inserted which has an inserted length of from one half period to five periods, and an inserting period of from 0.01 seconds to 120 seconds, into the alternating current of the stationary operating frequency. Furthermore, the parameters of the low frequency are changed according to changes of the operating voltage of the discharge lamp.

9 Claims, 5 Drawing Sheets

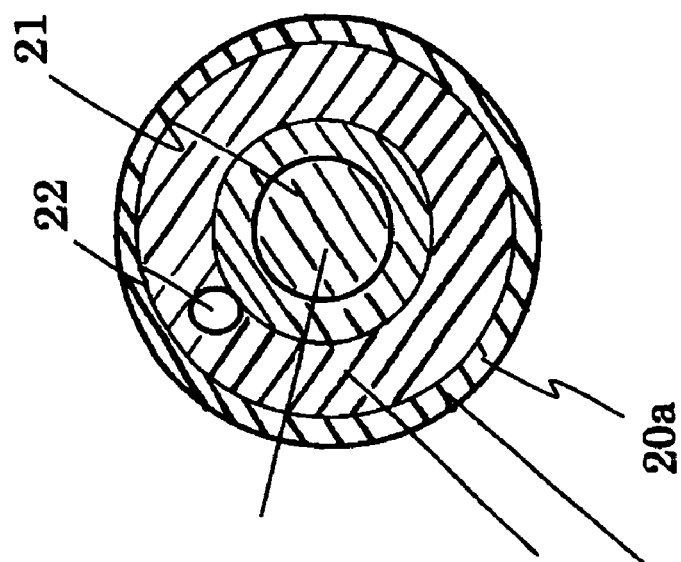
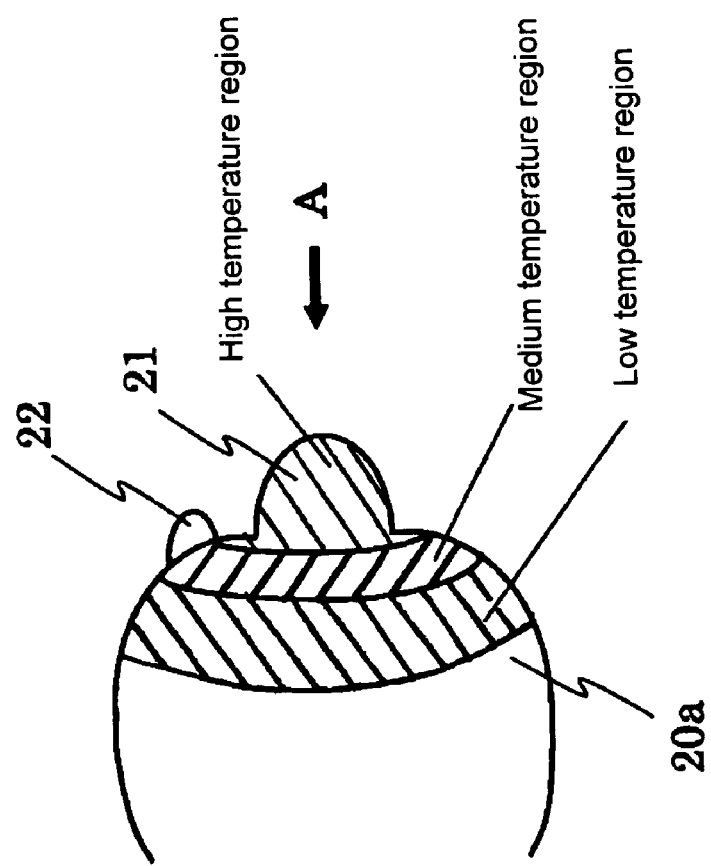
Fig. 4(a)
Fig. 4(b)

DEVICE FOR OPERATION OF A HIGH PRESSURE DISCHARGE LAMP

BACKGROUND OF THE INVENTION

1. Field of Invention

The invention relates to a device for operation of a high pressure discharge lamp. The invention relates especially to such a device for operation which comprises a super-high pressure discharge lamp which is filled with at least 0.2 mg/mm$^3$ of mercury and in which the pressure during operation reaches at least 200 atm, as well as to a feed device therefor.

2. Description of Related Art

Projector devices are generally of a type that uses a liquid crystal cell or a type that uses a DLP (digital light processor).

In the type using a liquid crystal cell, there are a one sheet type and a three sheet type. In each type, the following takes place:

The radiant light from the light source is separated into three colors (RGB; R=red, G=green, B=blue).

The light which contains the video information is transmitted and regulated by a liquid crystal cell;

Afterwards three colors which have been transmitted by the cell are combined and projected onto the screen.

In the type using the DLP there are also a one sheet type and a three sheet type. In the DLP one sheet type, the following takes place:

The radiant light from the light source is emitted via a rotary filter in which RGB areas are formed by division, onto a space modulation element (also called a light modulation device—specifically a D(igital) M(icro mirror) D(evice) element or the like should be understood here) or the like by time division, Certain light is reflected from this DMD and emitted onto a screen.

Here, the term "DMD element" is defined as providing complete coverage with several hundred million small mirrors with the light projection being controlled by controlling the orientation of the individual small mirrors.

For the light source of the projector device, a high pressure discharge lamp with a high mercury vapor pressure is used. The reason for this is that, because the mercury vapor pressure is high, light in the visible wavelength range is emitted with high intensity.

Furthermore, formation of projections on the electrode tips during operation in such a discharge lamp is known. For example, in Japanese patent disclosure document 2002-175890 and corresponding U.S. Pat. No. 6,713,972, the presence of these projections is regarded as a disadvantage and a technology is presented in which the projections are caused to disappear. Specifically, a technology is disclosed in which the frequency of rated operation maintains a lower frequency (for example, 5 Hz) for at least 1 second, and in this way, the electrode surface is caused to melt so that the projections completely disappear.

Even if a high pressure discharge lamp has been used as the light source of a projector device by the above described technology, the arc spot did not become stable and so-called flicker formed to a great extent. This occurred especially in a discharge lamp with an amount of added mercury of at least 0.20 mg/mm$^3$.

SUMMARY OF THE INVENTION

The object of the invention is to positionally stabilize the arc spot in a super-high pressure discharge lamp which is filled with an amount of mercury that is greater than or equal to 0.20 mg/mm$^3$, and to prevent the formation of so-called flicker.

The above described object is achieved in accordance with the invention in a device for operation of a high pressure discharge lamp which comprises the following:

a high pressure discharge lamp in which, in a discharge vessel made of silica glass, there is a pair of opposed electrodes with projections having formed on their tips, the electrodes being arranged at a distance of from each other of less than or equal to 2.0 mm and mercury being enclosed in an amount greater than or equal to 0.20 mg/mm$^3$ along with a halogen in the range of $10^{-6}$ μmole/mm$^3$ to $10^{-2}$ μmole/mm$^3$; and a feed device which supplies an alternating current to this discharge lamp, by the feed device of the above described high pressure discharge lamp being made to supply a frequency which is in the range from 60 Hz to 1000 Hz as the stationary operating frequency, and moreover, by inserting into the alternating current of the above described stationary operating frequency, a low frequency which is lower than the stationary frequency and is in a frequency range from 5 Hz to 200 Hz, a range of inserted length of at least one half period to at most five periods, and a range of the insert time period of from 0.01 seconds to 120 seconds, with the parameters of the low frequency which are to be selected being changed according to the change of the operating voltage of the discharge lamp.

Advantages

According to the invention, the above described arrangement has the following advantages and effects:

1. Projections are formed on the electrode tips and a stable arc discharge is formed, these projections each acting as a start point. As is disclosed in U.S. Pat. No. 6,173,972 B2, it is not a technology in which projections are eliminated, but a technology in which projections are actively produced and used. In this way, there is the special action that the operation of the discharge lamp can be stabilized by the arc in which these projections each act as a start point.

2. The formation of superfluous projections besides the projections which act as the arc start point is prevented. The reason for this that, when several projections are formed, between these projections, a so-called arc jump is formed. As a result, the arc becomes unstable. According to the invention, only projections are produced and maintained which are to act as an arc start point, and moreover, superfluous projections aside from these projections are caused to disappear.

3. In the case of increasing the lamp voltage, as a result of a deterioration or the like which occurs over time, the above described first and second advantages and actions can be achieved.

The invention is further described below using the accompanying drawings.

BRIEF DESCRIPTION OF THE DRAWINGS

FIGS. 4(*a*) & 4(*b*) are side and front schematic illustrations of an electrode on an enlarged scale for use in describing the invention;

DETAILED DESCRIPTION OF THE INVENTION

Figure 1:
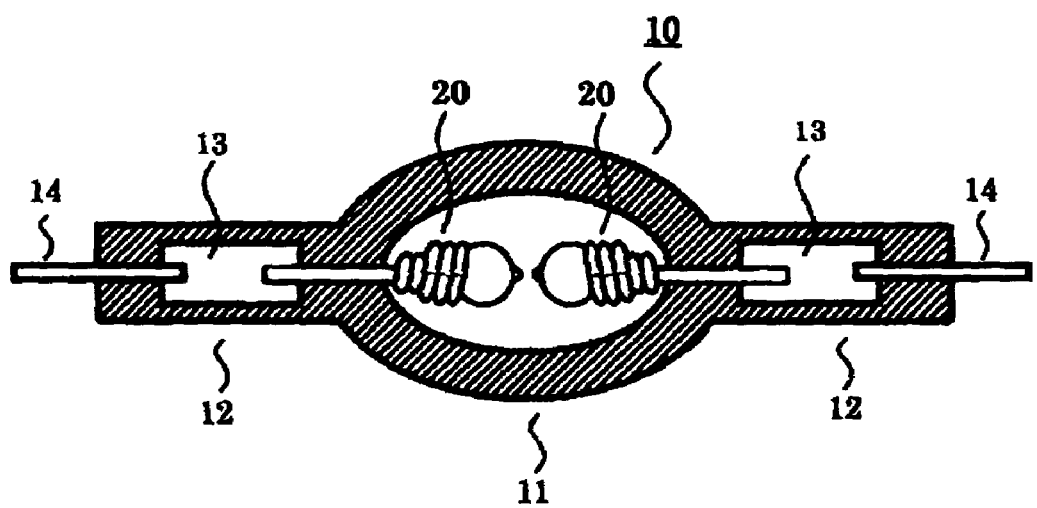
FIG. 1 is a schematic cross-sectional view of a high pressure discharge lamp in accordance with the invention.

FIG. 1 schematically shows a high pressure discharge lamp in accordance with the invention that has an essentially spherical light emitting part 11 which is formed as part of a silica glass discharge vessel. In this light emitting part 11, there is a pair of opposed electrodes 20 at a distance from on another of at most 2 mm. On opposite ends of the light emitting part 11, hermetically sealed portions 12 are formed in which a molybdenum conductive metal foil 13 is hermetically installed, for example, by a shrink seal. The shaft 20*b* of the electrode 20 is connected to one end of the respective metal foil 13. An outer lead 14 is connected to the other end of the respective metal foil 13. Current is supplied by a feed device which is located outside of the lamp.

The light emitting part 11 contains mercury, a rare gas and a halogen gas. The mercury is used as a light emitting substance to obtain the required wavelength of visible radiation, for example, to obtain radiant light with wavelengths of 360 nm to 780 nm, and is added in an amount that is equal or greater than 0.2 mg/mm$^3$. With this added amount, differently depending on the temperature condition, during operation, a vapor pressure is generated of at least 200 atm, i.e., an extremely high vapor pressure is reached. By adding a larger amount of mercury, a discharge lamp with a high mercury vapor pressure during operation of at least 250 atm or 300 atm can be produced. The higher the mercury vapor pressure, the more suitable the light source for a projector device which can be implemented.

As the rare gas, for example, roughly 13 kPa of argon gas is added to improve ignitability. The halogens can be iodine, bromine, chlorine and the like in the form of a compound with mercury or another metal. The amount of halogen added is chosen in the range from $10^{-6}$ μmole/mm$^3$ to $10^{-2}$ μmole/mm$^3$. The function of the halogen is to prolong the service life using the so-called halogen cycle. For an extremely small discharge lamp with an extremely high operating vapor pressure, like the discharge lamp in accordance with the invention, it also serves for preventing devitrification of the discharge vessel.

The numerical values of a discharge lamp are shown below by way of example:
the maximum outside diameter of the light emitting part is 9.4 mm;
the distance between the electrodes is 1.0 mm;
the inside volume of the arc tube is 75 mm$^3$;
the rated voltage is 70 V; and
the rated wattage is 120 W.

The lamp is operated using an alternating current.

Such a discharge lamp is installed in a projector device which should be as small as possible. On the one hand, since it is required that the overall dimensions be extremely small, and since, on the other hand, there is a demand for a high emission light intensity, the thermal effect in the light emitting part is extremely severe. The value of the wall load of the lamp is 0.8 W/mm$^2$ to 2.0 W/mm$^2$, specifically 1.5 W/mm$^2$.

That the lamp has such a high mercury vapor pressure and such a high value of the wall load leads to the fact that it can offer radiant light with good color reproduction when it is installed in a projector device or a presentation apparatus, such as an overhead projector or the like.

In the course of lamp operation, a projection is formed on the tip of the respective electrode 20 (on the end which faces the other electrode). The phenomenon that projections are formed is not entirely clear, but the following can be assumed.

The tungsten (electrode material) which has been vaporized from the area with a high temperature in the vicinity of the electrode tip during lamp operation also combines with the halogen and residual oxygen which are present in the arc tube. When the halogen is, for example, Br, it is present as a tungsten compound, such as $WBr$, $WBr_2$, $WO$, $WO_2$, $WO_2Br$, $WO_2Br_2$ or the like. These compounds decompose in the area with a high temperature in the gaseous phase in the vicinity of the electrode tips and become tungsten atoms or tungsten cations. By thermal diffusion (diffusion of the tungsten atoms which takes place from the area with a high temperature in the gaseous phase (=arc interior) in the direction toward the area with a low temperature (=the vicinity of the electrode tip) and by the tungsten atoms being ionized in the arc, cations form and are drawn in the direction to the electrode which operates as the cathode, the tungsten vapor density in the gaseous phase becomes high in the vicinity of the electrode tip, by which precipitation takes place on the electrode tip and by which projections are formed here.

Figure 2:
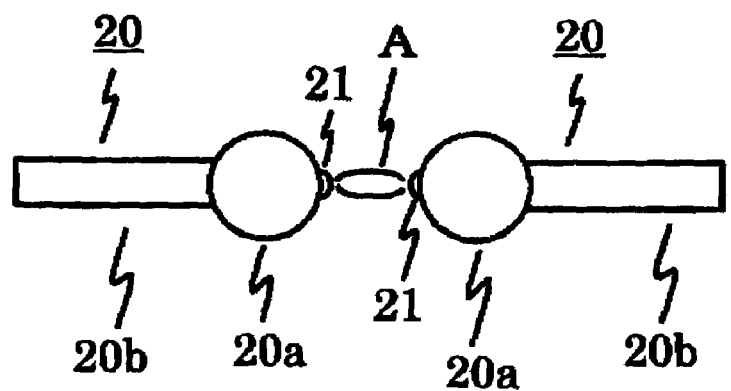
FIG. 2 is a schematic representation of the electrodes of the high pressure discharge lamp in accordance with the invention.

FIG. 2 schematically shows the tips of the electrodes 20 of FIG. 1 in order to illustrate the electrode tips and the projections. The electrode 20 has a spherical part 20*a* and a shaft 20*b*. On the tip of the spherical part 20*a*, a projection 21 is formed. This projection 21, even in the case in which it is not present when lamp operation starts, is formed by subsequent operation—so to speak, by self-formation.

This projection is not formed in each discharge lamp. It is known that in a discharge lamp of the short arc type with a distance between the electrodes of at most 2 mm, in which the light emitting part is filled with at least 0.15 mg/mm$^3$ of mercury, a rare gas and a halogen in the range from $1 \times 10^{-6}$ μmole/mm$^3$ to $1 \times 10^{-2}$ μmole/mm$^3$, projections are formed in the course of lamp operation.

The numerical values of the size of the projection are shown below by way of example:
the maximum diameter of the electrode (direction which is perpendicular to the discharge direction) is 1.0 mm to 1.5 mm and
the diameter in the case of a distance between the electrodes of 1.0 mm to 1.5 mm is roughly 0.2 mm to 0.6 mm.

The above described projection is essential in the case in which the discharge lamp, which has a distance between the electrodes that is less than or equal to 2 mm, and in which the arc tube contains at least 0.2 mg/mm$^3$ mercury, is used as the light source of a projector device, like the discharge lamp in accordance with the invention.

The reason for this is that, in a discharge lamp in which the arc tube contains at least 0.2 mg/mm$^3$ of mercury and in which the operating pressure reaches at least 200 atm, the arc discharge is contracted to be small by a high vapor pressure and that, as a result, the discharge start point is contracted to be small.

As is disclosed in U.S. Pat. No. 6,713,972 B2, therefore, for a spherical electrode in which the projections have been eliminated, the discharge start point moves in a flickering manner; this leads to the disadvantage of flicker on the screen of the projector device. In particular, the arc spot which is formed at a short distance between the electrodes of at most 2 mm can, itself, lead to flickering which is fatal for the picture for a small movement of at most 0.5 mm.

It can be imagined in this respect that the discharge lamp disclosed in U.S. Pat. No. 6,713,972 B2 has been able to eliminate the disadvantage of flicker when the action of contracting the discharge arc and the discharge start point is small, i.e., when the electrode has a spherical tip, since here the amount of added mercury is 0.18 mg/mm$^3$ and not at least 0.20 mg/mm$^3$, as in the present invention.

Furthermore, since projections are formed on the electrode tips, and thus, an arc discharge forms proceeding from them, the light from the arc is shielded less by the spherical part 20a of the electrode. The degree of light utilization therefore increases. As a result, the advantage also arises that a brighter picture is obtained. Normally, the tip of the shaft 20b, however, has an element which corresponds to a spherical part which has a greater diameter than the axial diameter.

The high pressure discharge lamp is operated using an alternating current with the feed device described below with the stationary frequency (60 Hz to 1000 Hz). Furthermore, a frequency (low frequency) which is lower than the stationary frequency is inserted into the stationary frequency, and thus, operation is carried out. At the low frequency, the frequency is 5 Hz to 200 Hz, the inserted length is from a half period up to five periods and the insertion period is 0.01 second to 120 seconds.

Figure 3:
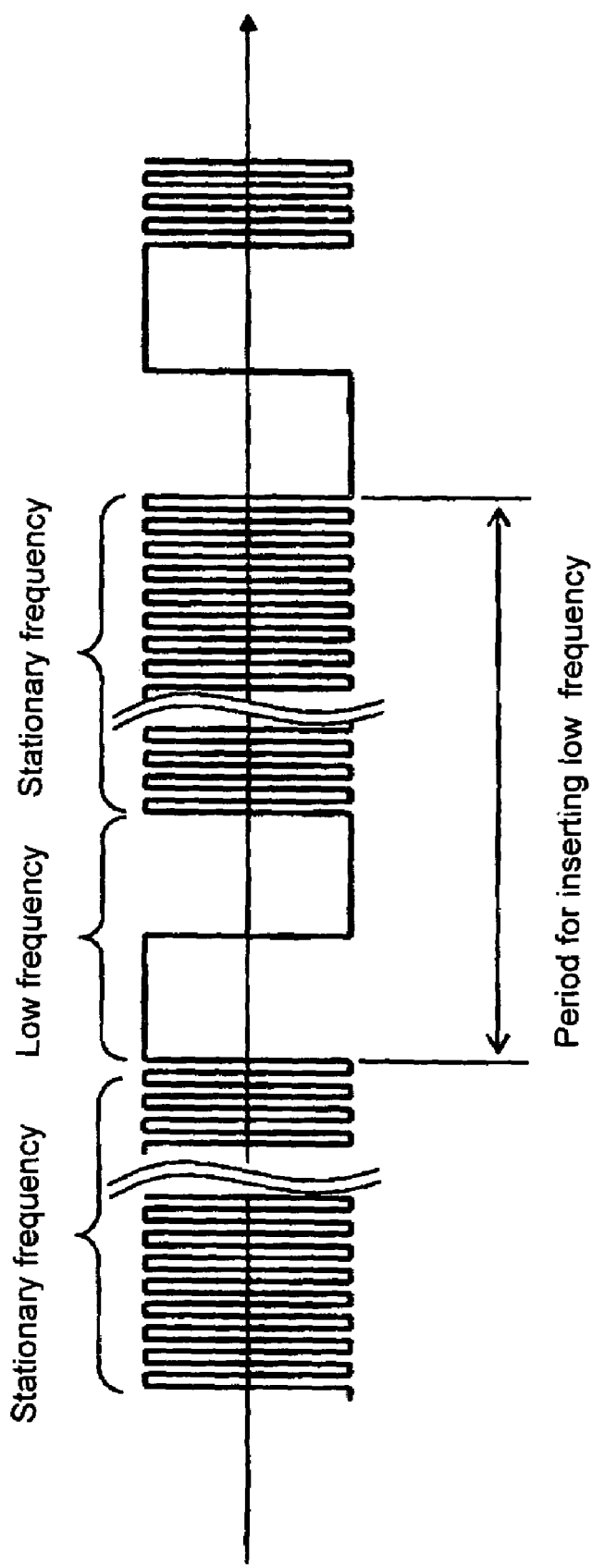
FIG. 3 is a schematic of the current waveform of a discharge lamp in accordance with the invention.

FIG. 3 shows the current waveform of the discharge lamp 10. In the drawings, the y-axis plots the current value and the x-axis plots the time.

As shown is FIG. 3, the discharge lamp during driving with the stationary frequency, for example, with 200 Hz, is driven intermittently with a lower frequency than this stationary frequency, for example, with 10 Hz. The low frequency is, as was described above, a frequency which is selected from the range from 5 Hz to 200 Hz and periodically occurs with a time interval of from 0.01 sec to 120 sec. The periods within which this low frequency is inserted is the time interval in the drawings which is designated the "period for inserting low frequency", and is defined as the time interval from an event in time in which a one-time low frequency waveform begins, to an event in time in which the next low frequency waveform begins. The length of time in which operation occurs with the inserted low frequency is not limited to a period as is shown in FIG. 3, but is selected from a time interval of from one half period to at most 5 periods.

At this point, the advantages and effects which originate by the periodic insertion of operation with a low frequency into operation with the stationary frequency are described.

That, in the discharge lamp in accordance with the invention, the formation of projections on the electrode tips is advantageous for the purpose of stabilization of the arc has already been described.

However, if it is only a matter of control in which only projections are produced, superfluous projections form besides the actually required projections. Therefore, in accordance with the invention, operation with the low frequency is periodically inserted into operation with the stationary frequency and the invention is essentially making excess projections disappear.

FIGS. 4(a) & 4(b) are each a comparative representation for description of the invention. They each schematically show an undesirable state which occurs in the case in which the frequency control in accordance with the invention is not carried out.

When the lamp is operated, in the middle of the tip of the spherical part 20a of the electrode a projection 21 (a first projection) is formed. This projection 21 is a projection which acts as the discharge lamp start point and which is necessary for stabilization of the arc. In the course of continued operation of the lamp, in the vicinity of the projection 21, another projection 22 (a second projection) is formed. This projection 22 is a projection which is actually unnecessary and causes the disadvantage of so-called flicker by the movement of the discharge start point between the projection 21 and the projection 22. The second projection is not always present individually, but there are also cases in which a plurality of second projections form.

The phenomenon that unnecessary projections 22 (second projections) form and grow can be described as follows.

On the electrode surface, during operation of the discharge lamp, there is a temperature distribution. The temperature is highest in the tip area and becomes lower, the nearer the rear area.

In the high temperature region in the vicinity of the electrode tip, by vaporization of the tungsten and by vaporization of tungsten oxide such as WO, WO$_2$ and the like which has been produced by a reaction with oxygen which has remained in the discharge vessel, the electrode surface is eroded. As was described above, on the electrode tip which constitutes the discharge start point, due to the high vapor density of the tungsten in the arc, precipitation, accumulation of tungsten and formation of the above described first projection occur.

On the other hand, in the area with the low temperature of the electrode surface, due to vaporization of WBr, WBr$_2$, WO$_2$Br, WO$_2$Br$_2$ and the like which has been produced by a reaction with the bromine added to the discharge vessel and with the oxygen which remained, the electrode surface is likewise eroded.

The types of tungsten compound which vaporize do differ depending on the temperature of the electrode surface. However, both the high temperature region of the electrode surface and also the region with the low temperature are eroded.

In the temperature range between the above described high temperature region and the region with the low temperature of the electrode surface, the above described tungsten compounds are produced only to a small extent due to the thermal property of the tungsten. The electrode surface is therefore only eroded to a small extent. Rather, precipitation and accumulation of the tungsten vapor which is present in the discharge vessel are dominant. The above described second projection is formed and therefore grows.

The first projection is thus essential and must be maintained without causing it to disappear. On the other hand the second projection is unnecessary and must be caused to disappear.

The control of the frequency in accordance with the invention causes the above described second projection to disappear. This mechanism is described below.

When the discharge lamp is subjected to rated operation with a frequency from 60 Hz to 1000 Hz, in the middle temperature region of the electrode surface, the formation of the above described second projection begins, as was described above. If, in doing so, switching over to a lower frequency than the frequency of rated operation takes place, the time interval during which the electrode operates as an anode is lengthened, and the temperature increases on the electrode tip. This temperature increase is routed into the middle temperature region in which the second projection began to form, and increases the surface temperature of this area. As a result, vaporization, erosion and disappearance of the second projection which has started to form take place.

Here, in order to suppress the formation and growth of the second projection, a change of the temperature of the electrode surface over time is extremely important. Also, when the temperature of the entire electrode surface is set high, for example, by reducing the electrode dimensions, this does not mean that the formation of the second projection is suppressed. Instead, the result is that the second projection in the area with the low temperature is formed behind the electrode.

In accordance with the invention, therefore, the formation of the second projection at a certain position is prevented by the temperature of the electrode surface changing within a suitable time interval. As a measure for this, an arrangement is undertaken in which a low frequency is generally inserted.

The frequency to be inserted is chosen from the range from 5 Hz to 200 Hz. The time period during which it is to be inserted (time interval from the beginning of one insertion to the beginning of the next insertion as defined above) is selected from the range from 0.01 sec to 120 sec. The inserted length is in the range of one half period to five periods.

In the case of a frequency of less than 5 Hz, in the case of an insert period of less than 0.01 second and in the case of an inserted length of greater than five periods, the temperature of the electrode tip becomes too high. In doing so, not only does the above described second projection disappear, but the above described first projection which is actually necessary and essential also disappears.

In the case of a frequency of greater than 200 Hz and in the case of an inserted length of less than one half period, in the area in which the above described second projection is formed, a sufficient temperature increase is not obtained. As a result the second projection cannot be made to disappear. The reason for this is as follows:

In the case in which the inserted period exceeds 120 seconds, during rated operation, the second projection grows unduly, so that it cannot disappear itself by inserting a low frequency.

In the discharge lamp in accordance with the invention, it is assumed that the amount of added mercury is at least 0.2 mg/mm$^3$. An experiment of the inventors confirmed that the effect of mercury vapor during operation on the arc is small in the case in which the amount of added mercury is less than 0.2 mg/mm$^3$, specifically 0.18 mg/mm$^3$. This means that, in the case of an amount of added mercury of 0.18 mg/mm$^3$, the arc never fluctuates, even if the surface of the electrode tip is smooth (without a projection). However, if the amount of added mercury reaches at least 0.2 mg/mm$^3$, the action of contraction of the arc by the vapor pressure during lamp operation is exceptionally great. In this way, the phenomenon occur that the arc moves (fluctuates).

In the invention, the necessity of formation of projections on the electrode tips for stabilization of the arc in a discharge lamp to which at least 0.2 mg/mm$^3$ of mercury has been added was ascertained. It can be stated that a major feature of the invention is that, under the assumption that there are projections on the electrode tips, to prevent formation and growth of unnecessary projections, operation with a given low frequency has been inserted.

Furthermore, the invention is characterized in that, according to the change of the operating voltage of the discharge lamp, the parameters such as the frequency to be inserted, the period to be inserted, the inserted length, the stationary frequency and the like, are changed.

The high pressure discharge lamp in accordance with the invention is normally subjected to a so-called constant wattage operating control, the operating wattage being a constant value. The reason for this is the stable maintenance of the level of light intensity and constant maintenance of the load on the discharge lamp, especially the thermal burden on the discharge vessel of silica glass.

Therefore, if over the course of operation of the discharge lamp the electrodes wear and the distance between the electrodes lengthens, the lamp voltage increases and the lamp current conversely drops.

When the lamp current drops, the heat inflow to the electrodes decreases. The temperature change of the electrode surface by the insertion of the low frequency therefore decreases. The above described action of making the second projection disappear is thus insufficient.

The expression "according to the change of the operating voltage of the discharge lamp" is defined not only as control according to the change of the operating voltage, but can also be defined as the change of the parameters of the low frequency in the case of greater than a threshold value or less than a threshold value when the threshold value of the voltage is fixed.

Therefore, in accordance with the invention, according to the operating voltage, the parameters of the frequency to be inserted are changed so that the action of disappearance of the second projection with the change of the operating voltage of the discharge lamp is not reduced. Specifically the procedure is as follows:

In the case, for example, of an increase of the lamp voltage (reduction of the lamp current), the frequency of the low frequency which is to be inserted is reduced. By prolonging the time during which the electrode operates as an anode, the reduction of the lamp current is compensated and the temperature of the electrode surface can be increased.

Or in the case of an increase of the lamp voltage, the period of the low frequency which is to be inserted can be shortened. The reason for this is that by shortening the operating time by the stationary frequency, the growth of the second projection which forms during this time can be reduced.

Furthermore, in the case of increasing the lamp voltage, the length with which the low frequency is inserted into a single insertion time interval can also be lengthened. The reason for this is that, by increasing the frequency of the change of the temperature of the electrode surface during the insertion time interval of a single low frequency, the disappearance of the second projection can be accelerated.

Furthermore, in the case of increasing the lamp voltage, the frequency of rated operation can also be increased. The reason for this is the following:

The higher the frequency of rated operation, the higher the first projection which is formed. Using this property the lamp voltage can be reduced.

In the above described process for changing the frequency of the low frequency, the period of the inserted low frequency and the inserted length of the low frequency in the case of an increase of the lamp voltage, by decreasing the lamp current. A reduction of the action of making the unwanted second projection disappear is compensated, while in the process for increasing the frequency of rated operation the lamp voltage (lamp current) returns to the initial state.

The case of an increase of the lamp voltage was described above. In the case of a reduction of the lamp voltage (in the case of an increase of the lamp current), the parameters of respective operation are changed in opposite directions.

Furthermore, according to the lamp voltage, also only one of the above described parameters can be changed or some parameters can be combined with one another and changed.

The numerical values of the parameter change according to the above described lamp voltage are shown below by way of example.

In the case of constant wattage control with a rated wattage of 120 W, a lamp voltage of 70 V and a lamp current of 1.7 A of the discharge lamp, the stationary frequency is 180 Hz, the frequency of the low frequency is 15 Hz, the inserted length is one period and the inserting period is 1 second.

Assuming that the lamp voltage increases from 70 V to 85 V, the lamp current changes to 1.4 A. In this case, the stationary frequency changes to 360 Hz, the frequency of the low frequency to 10 Hz, the inserted length remains one period and the inserting changes period to 0.5 seconds. In this way, even if the lamp voltage increases and the lamp current decreases, the growth of the unwanted second projection can be prevented and the arc stabilized.

Figure 5:
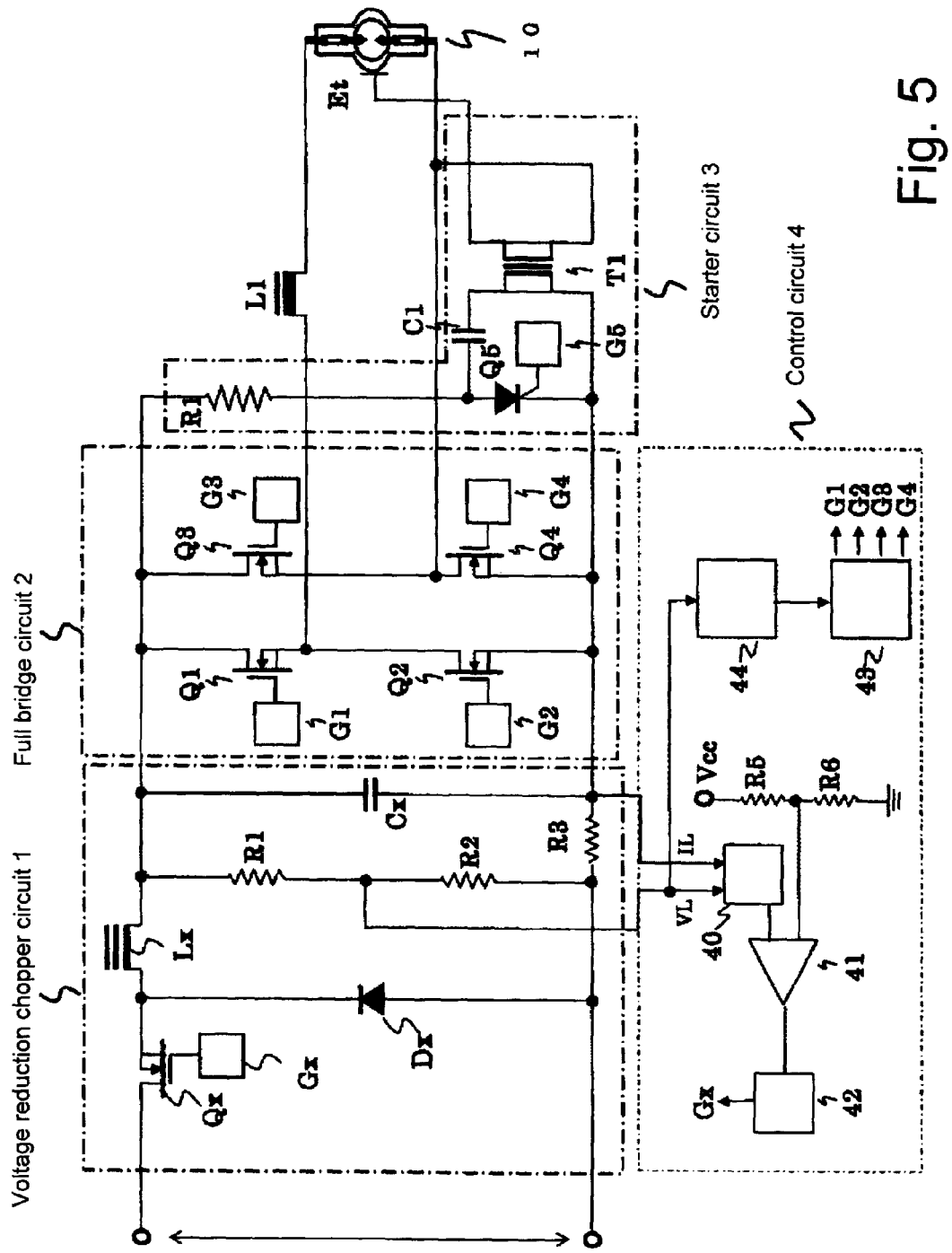
FIG. 5 is a circuit diagram of a feed device of the high pressure discharge lamp operating device in accordance with the invention, and FIGS. 6(*a*) to 6(*c*) each show a schematic of another version of the current waveform of a discharge lamp in accordance with the invention.

FIG. 5 shows a feed device which operates the discharge lamp.

The operating device comprises a discharge lamp 10 and a feed device. The feed device comprises a voltage reduction chopper circuit 1 which is supplied with a direct current voltage, an inverter circuit of the full bridge type 2 which is connected to the output side of the voltage reduction chopper circuit 1, which converts the direct current voltage into an alternating current voltage, and supplies it to the discharge lamp 1 (hereinafter also called a full bridge circuit), a coil L1 which is series-connected to the discharge lamp, a capacitor C1 and a starter circuit 3. The feed device which, together with the discharge lamp 10, is called the operating device is formed from the voltage reduction chopper circuit 1, the full bridge circuit 2, the starter circuit 3 and a control circuit 4.

The voltage reduction chopper circuit 1 is connected to a direct current source $V_{DC}$ and consists of a switching device Qx, a diode Dx, a coil Lx, a smoothing capacitor Cx and a driver circuit Gx of the switching device Qx. The switching device Qx is subjected to on/off operation by the driver circuit Gx. The duty factor of the switching device Qx is regulated by this driving. Thus the current or the wattage which is supplied to the discharge lamp 10 is controlled.

Resistors R1, R2 for voltage determination and a resistor R3 for current determination are connected downstream of the diode DX and the coil Lx.

The full bridge circuit 2 comprises switching devices Q1 to Q4, such as a transistor or a FET, which are connected in the manner of a bridge, and of driver circuits G1 to G4 of the switching devices Q1 to Q4. There are also cases in which diodes are connected anti-parallel to the switching devices Q1 to Q4. However, the diodes are not present in this embodiment.

The above described switching devices Q1 to Q4 are driven via a control element (not shown) by the driver circuits G1 to G4.

The full bridge circuit 2 operates as follows:

The switching devices Q1, Q4 and the switching devices Q2, Q3 are repeatedly turned on and off in alternation. When the switching devices Q1, Q4 are ON, current flows in the path of voltage reduction chopper circuit 1→switching device Q1→coil L1→discharge lamp 10→switching device Q4→voltage reduction chopper circuit 1.

On the other hand, when the switching devices Q2, Q3 are ON, an alternating current with rectangular waves is supplied in the path of the voltage reduction chopper circuit 1→switching device Q3→discharge lamp 10→coil L1→switching device Q2→voltage reduction chopper circuit 1 of the discharge lamp 10.

When the above described switching devices Q1 to Q4 are driven, to prevent switching devices Q1 to Q4 from being on simultaneously, there is a time interval (dead time Td) when the polarity of the rectangular alternating waves is switched over, in which all switching devices Q1 to Q4 are turned off.

The starter circuit 3 comprises a switching device Q6, a driver circuit G6, a capacitor C1 and a transformer T1. When the discharge lamp 10 starts, energy which has been stored in the capacitor C1 is supplied. In this embodiment, a so-called outside trigger type is used in which the outside surface of the discharge lamp 10 is provided with a trigger for applying a high voltage.

The control circuit 4 comprises a power converter 40, a comparator 41, a pulse width modulation circuit 42, a low frequency setting circuit 43 and a driver circuit 44 for rectangular waves.

After conversion of the voltage signals and the current signals which have been determined by the resistors R1, R2, R3 into power signals by the power converter 40, they are compared in a comparator 41 to the reference power values, by which the switching device Qx is subjected to control with feedback via the pulse width modulation circuit 42. In this way, so-called constant power control is exercised in which the operating wattage of the lamp is a constant value.

The voltage signals which have been determined by the resistors R1, R2 are sent to the low frequency setting circuit 43. Here, according to the value of the lamp voltage, the frequency of the low frequency, the inserted length, the inserting period or the frequency in rated operation is set. The signals of the low frequency setting circuit 43 are sent to the driver circuit 44 for rectangular waves and control the switching of the switching devices Q1 to Q4 of the full bridge circuit 2. The insertion of the low frequency into the stationary frequency is therefore carried out by switching operation and the timing of the switching devices Q1, Q2, Q3 and Q4.

The respective reference value of the frequency (5 Hz to 200 Hz) of the low frequency, the inserted length (half period up to five periods) and the inserted period (0.01 seconds to 120 seconds) is suitably chosen in conjunction with the construction of the discharge lamp, especially with the thermal construction of the electrodes. Here the expression "reference value" means a value before increasing the lamp voltage.

One example is described below.

At a rated wattage of 120 W of the discharge lamp:
the stationary frequency is 180 Hz;
the frequency of the low frequency is 15 Hz;
the inserted length is 1 period and
the inserting period is 1 second (operating example 1).

At a rated wattage of 150 W of the discharge lamp:
the stationary frequency is 200 Hz;
the frequency of the low frequency is 10 Hz;
the inserted length is 1 period and
the insert period is 1 second (operating example 2).

At a rated wattage of 300 W of the discharge lamp:
the stationary frequency is 300 Hz;
the frequency of the low frequency is 7.5 Hz;
the inserted length is 1 period and
the inserting period is 0.5 second (operating example 3).

At a rated wattage of 250 W of the discharge lamp:
the stationary frequency is 400 Hz;
the frequency of the low frequency is 5 Hz;
the inserted length is 1 period and
the inserting period is 0.5 second (operating example 4).

At a rated wattage of 135 W of the discharge lamp:
the stationary frequency is 360 Hz;
the frequency of the low frequency is 45 Hz;
the inserted length is 0.5 period and
the inserting period is 0.02 second (operating example 5).

At a rated wattage of 135 W of the discharge lamp:
the stationary frequency is 540 Hz;
the frequency of the low frequency is 180 Hz;
the inserted length is 1 period and
the inserting period is 0.02 second (operating example 6).

Figure 6A:
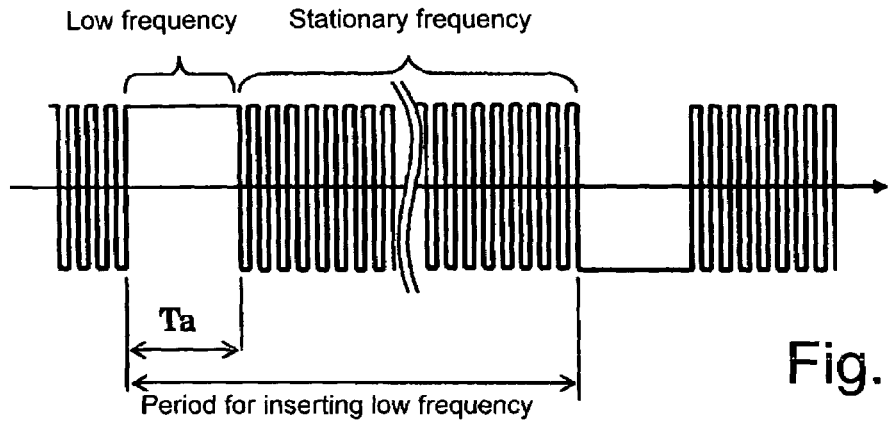
Figure 6B:
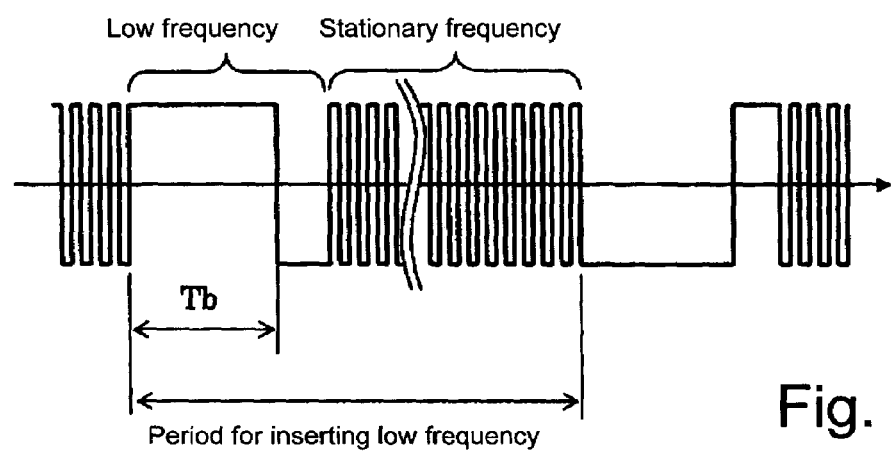
Figure 6C:
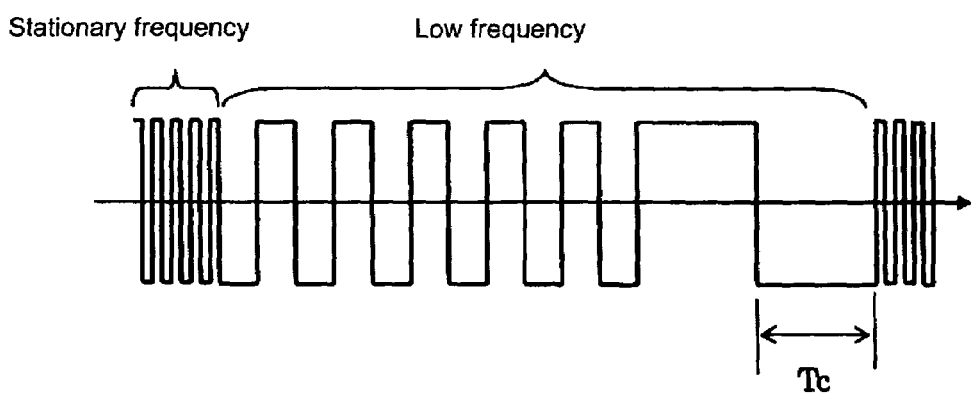

FIGS. 6(a) to 6(c) each show the waveform of the current which is flowing in the discharge lamp and which differs from the current waveform shown in FIG. 3.

FIG. 6(a) shows the case in which the current waveform has been inserted with a low frequency for a half period. In this case, in the time interval for insertion of the low frequency, the state is obtained in which one of the electrodes operates as an anode. The insert period of the low frequency can therefore be interpreted such that the time interval Ta shown in FIG. 6(a) is defined as the length of the half period. In the case of operation with insertion of a low frequency with such a half period, it is advantageous to insert it with a polarity different that in the preceding insertion.

FIG. 6(b) shows the case in which the current waveform of the low frequency is greater than a half period and smaller than one period. In this case, a time interval in which the length of time for fixing the current polarity is long can be defined as a half period. This means that it can be interpreted that, in FIG. 6(b), a time interval Th is defined as the length of the half period and that in FIG. 6(b) a low frequency current for a time interval with ¾ period has been inserted. The reason for the definition of the time interval in which fixing of the polarity lasts a long time as a half period is that there is the action that the second projection disappears by the temperature increase of the electrode surface during this time interval. In the case in which operation with a low frequency which is greater than such a half period and less than one period is inserted, it is desirable that insertion be carried out in such a way that the polarity changes in alternation with a longer time interval. The reason for this is that the temperature of the two electrodes can be increased uniformly.

FIG. 6(c) shows a configuration in which, when operating with a low frequency inserted, the frequency differs (changes). In this case, the insertion cycle (how many periods have been inserted) is defined by the lowest frequency. It can be interpreted that, in FIG. 6(c), a time interval Tc is defined as the half period and that one period of low frequency is inserted. The reason that the waveform of the lowest frequency is defined as the low frequency is that, during the time interval for insertion of this frequency, the time for fixing the polarity is longest, and thus, that the action of increasing the temperature of the electrode tip can be developed.

The above described definitions were made to prevent the insertion state (the configuration) of the low frequency as the waveform from becoming unclear. It can be stated that the definitions were made to illustrate the insertion time interval and the insertion cycle of the low frequency.

We claim:

1. Device for operation of a high pressure discharge lamp, comprising:

a high pressure discharge lamp having a discharge vessel made of silica glass in which there is a pair of opposed electrodes arranged at a distance of at most 2.0 mm from each other and containing at least 0.20 mg/mm$^3$ of mercury and $10^{-6}$ μmole/mm$^3$ to $10^{-2}$ μmole/mm$^3$ of a halogen; and a feed device which supplies an alternating current to the discharge lamp, wherein the feed device supplies the alternating current with a frequency in the range from 60 Hz to 1000 Hz as a stationary operating frequency and inserts a low frequency into the alternating current of said stationary operating frequency, said low frequency being lower than the stationary frequency and in a frequency range from 5 Hz to 200 Hz, having an inserted length of from one half period to five periods, and an inserting period of from 0.01 seconds to 120 seconds, and wherein the feed device is adapted to change the parameters of the low frequency according to changes of the operating voltage of the discharge lamp.

2. Device for operation of a high pressure discharge lamp in accordance with claim 1, wherein at least one of the following parameters is changed according to changes of the operating voltage of the discharge lamp:
frequency of the low frequency,
insertion period of the low frequency,
insertion length of the low frequency.

3. Device for operation of a high pressure discharge lamp in accordance with claim 2, wherein the feed device decreases the frequency of the low frequency when the operating voltage of the discharge lamp increases and increases the frequency of the low frequency when the operating voltage of the discharge lamp decreases.

4. Device for operation of a high pressure discharge lamp in accordance with claim 2, wherein the feed device decreases the inserting period of the low frequency when the operating voltage of the discharge lamp increases and increases said inserting period when the operating voltage of the discharge lamp decreases.

5. Device for operation of a high pressure discharge lamp in accordance with claim 2, wherein the feed device decreases the inserted length of the low frequency when the operating voltage of the discharge lamp decreases and increases said inserted length when the operating voltage of the discharge lamp increases.

6. Device for operation of a high pressure discharge lamp in accordance with claim 2, wherein the feed device changes the stationary operating frequency according to changes in the operating voltage of the discharge lamp.

7. Device for operation of a high pressure discharge lamp in accordance with claim 6, wherein the feed device decreases the stationary operating frequency when the operating voltage of the discharge lamp decreases and increases said stationary operating frequency when the operating voltage of the discharge lamp increases.

8. Device for operation of a high pressure discharge lamp in accordance with claim 1, wherein the feed device changes the stationary operating frequency according to changes in the operating voltage of the discharge lamp.

9. Device for operation of a high pressure discharge lamp in accordance with claim 8, wherein the feed device decreases the stationary operating frequency when the operating voltage of the discharge lamp decreases and increases said stationary operating frequency when the operating voltage of the discharge lamp increases.

* * * * *